April 12, 1960
J. GOODMAN
2,932,591
DIELECTRIC COATED ELECTRODES
Filed June 26, 1956
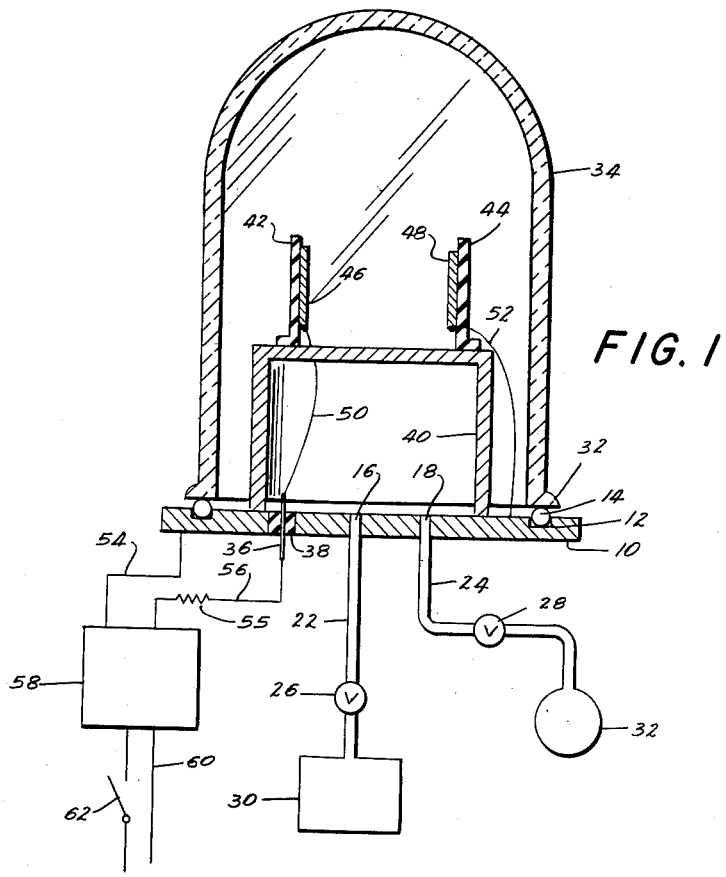
FIG. 1
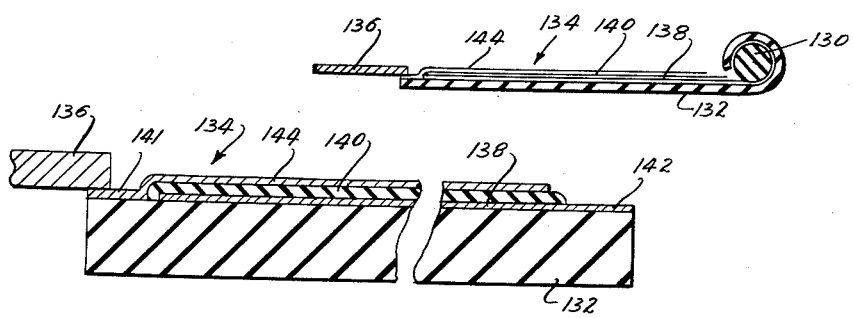
FIG. 2
FIG. 3
INVENTOR.
JEROME GOODMAN
BY Robert C Schwartz Jr.
ATTORNEY United States Patent Office 2,932,591
Patented Apr. 12, 1960

2,932,591

DIELECTRIC COATED ELECTRODES

Jerome Goodman, Brooklyn, N.Y., assignor to Radiation Research, Inc., a corporation of Florida Application June 26, 1956, Serial No. 593,907

6 Claims. (Cl. 117—201)

This invention relates to new and improved electrically insulated conductors and, more particularly, to electrically insulated electrodes for use in fabricating capacitors and the like and to new and improved methods for making such electrodes.

It is well known that reduction in capacitor size may be achieved by utilizing thin layers of dielectric materials, and use has been made of this fact to produce small capacitors. However, when attempts are made to use dielectric films of one or two microns thickness, a number of problems are encountered, one of which is failure of the capacitors due to electrical breakdown of the dielectric films. The cause of the breakdown is variously attributed to pin-hole-like apertures or to other forms of impurities entrained in the film.

It is an object of this invention, therefore, to provide dielectric films of less than two microns thickness which are substantially free of breakdown producing imperfections.

A second problem associated with dielectric films of such thinness has been their extreme fragility. Because the films are thin, they are not readily self-supporting and processes which call for their fabrication prior to application to an electrode or prior to insertion into a capacitor are at a disadvantage because of the extreme care which must be exercised.

It is another object of the invention, therefore, to provide a method for forming thin dielectric films directly on the surfaces on which they will be used.

Still another object of the invention is the provision of thin dielectric films which, when applied to thin conductive surfaces adapted for rolling into compact capacitor structures, will remain bonded to the conductive surface without cracking or flaking off.

A still further object of the invention is the production of thin dielectric films having resistivities of the order of $10^{14}$ ohm-centimeters or better.

I have found that thin dielectric films meeting the above needs and also useful in other applications which will be described below may be made by polymerizing an organic insulating material on an electrode.

It has been long known that polymerization of organic materials may be accomplished by the application of heat, by exposure to ultraviolet light, or by the use of a catalyst. Such methods have, in general, been applied to the preparation of bulk polymers. I have found, however, that organic substances, ionized and partially broken up into charged fragments in the plasma of a gaseous discharge may be drawn toward a particular surface by means of an electric field and that the particles will deposit there in the form of a film of polymerized material. Accordingly, thin films may be formed on a non-conductive surface interposed in such a field or upon the conductive surface of an electrode carrying discharge current.

While the exact nature of the polymerization process is not well understood, a number of general observations may be made about the manner in which it appears to operate.

It is well known that a flow of electrical current may be supported in a rarified gaseous atmosphere by subjecting the atmosphere to an electric field of sufficient intensity to cause the formation of ions in the gas. Where the gaseous atmosphere is at a pressure of about five millimeters (Hg), this discharge is of the nature of a glow discharge and current flowing between a pair of electrodes placed in the atmosphere is carried by ions and electrons. Such glow discharges are frequently used as light sources, since the ionized plasma of the discharge emits light, and in such applications one of the noble gases or mercury may be used as the atmosphere.

In my invention, the vapor of an organic material is substituted for the aforementioned noble gas and, under the influence of the discharge, the molecules of the vapor become ionized and partially broken into electrically-charged fragments, the degree of fragmentation which a particular molecule undergoes in the ionization process appearing to depend upon the molecular structure of the starting material. Thus, where styrene monomer has a readily reactive side chain, polymers produced by the process are essentially polystyrene, the benzene ring structure surviving the ionization process. However, where benzene itself is utilized as the starting material, the benzene ring structure itself appears to be attached, with the resulting polymer containing a relatively small proportion of the benzene ring structure. Thus, it appears that while starting materials of known character such as the above or such as those mentioned below may be polymerized in this manner, the repeating structure of the resulting ploymer is not always that of the starting material.

Another feature of the invention is its apparent relative insensitivity to changes in vapor pressure and discharge current. Thus, while upper and lower limits on the range of operating pressure are determined in terms of the point at which polymerization in a continuous homogeneous film ceases and the point at which current flow in the discharge ceases, the desired films may be polymerized successfully over the range of pressure in between. Similarly, while the range of current flowing in the discharge is limited on the upper side by carbonization of the deposited film, the principal effect of current variation below the point at which carbonization becomes appreciable is a proportional variation in the rate of production of polymerized film.

Other features and advantages of the invention will be seen from the below appended description and drawings in which:

Fig. 1 is a schematic representation in partial cross-section of an apparatus useful in the production of electrodes coated with a dielectric film;

Fig. 2 is a view in cross-section of a partially assembled capacitor employing a dielectric film made in accordance with the invention; and Fig. 3 is an enlarged view in cross-section of the structure shown in Fig. 2.

Fig. 1 illustrates one form of apparatus in which dielectric films may be produced according to the teachings of the invention. Base plate 10, which is conventionally made of metal, is provided with annular groove 12 for receiving rubber O-ring 14. Openings 16 and 18 are provided in base plate 10 to receive exhaust pipe 22 and vapor supply pipe 24, respectively. Pipes 22 and 24 are provided with control valves 26 and 28 for isolating vacuum system 30 and vapor supply flask 32. Seated on O-ring 14 is lip 32 of bell jar 34, a coating of vacuum grease having been applied to O-ring so as to insure hermetic integrity of the seal thus provided between bell jar 34 and base plate 10. A third opening in base plate 10 permits the passage of feed-through conductor 36 which is hermetically sealed in base plate 10 by means of insulator 38 in a manner well known in the art. Supported on pedestal 40 within the evacuable space thus provided by base plate 10 and bell jar 34 are insulating brackets 42 and 44 to which, in turn, electrodes 46 and 48 are fastened by means of clamping devices well known in the art. Electrode connecting leads 50 and 52 provide electrical connections between feed-through conductor 36 and electrode 46 and base plate 10 and electrode 48, respectively. Power supply connecting leads 54 and 56, in turn, provide external electrical connections between base plate 10 and feed-through conductor 36 and power supply 58. Resistor 55 is inserted in power supply connecting lead 56, serving to raise the power supply impedance as is conventional in gas discharge circuits. In the preferred form of the invention, power supply 58 is supplied with 110 volts, 60 cycle alternating current by means of electrical connections 60, the supply of power to the unit being controlled by means of switch 62. For convenience, the output voltage of power supply 58 should be variable and capable of supplying current to electrodes 46 and 48 over a range of voltage of, say, from 300 to 800 volts.

As an illustrative example of the manner of preparing dielectric films in accordance with the invention, films of substantially pinhole-free polystyrene may be formed on the opposed surfaces of electrodes 46 and 48 as follows. Bell jar 34 is evacuated by means of vacuum pump 30 and valve 26 is closed. Switch 62 may then be closed and a voltage of approximately 450 volts supplied to electrodes 46 and 48 from power supply 58. Valve 28 is then opened to allow styrene monomer vapor to flow from chamber 32, where pure degassed styrene monomer is contained in liquid form, into evacuated bell jar 34. the vapor pressure in bell jar 34 is allowed to rise to about 5 millimeters (Hg) or until ionization of the vapor occurs as evidenced by the emission of visible light from the plasma of an electrical discharge between the electrodes. The flow of vapor is then controlled by means of valve 22 to maintain the established level of the discharge, replenishing the supply of vapor as it is used up in the formation of polymer films on the electrodes. The process is continued until a film of the desired thickness is produced.

It has been found that the rate of deposition of polymer on the surfaces of electrodes 46 and 48 is a function of both vapor pressure in the discharge space and current flow in the area. Thus, for a given electrode surface area, an increase in vapor pressure will produce an increase in film production rate, and an increase in discharge current will also produce an increase in the deposition rate. Upper limits exist, however, which should not be exceeded. Too high a vapor pressure results in the premature polymerization of vapor in the discharge region away from the elyectrodes, resulting in the production of a polymer fog betwen the electrodes which is then collected on the electrode surfaces in a powdery, non-adherent, porous form of little utility as a dielectric. Similarly, where materials which may carbonize are used, the process is adversely affected by excessive current in the discharge, since high currents tend to produce carbonization of the material in the films being deposited on the electrodes. Such carbonization is undesirable because it tends to reduce the resistivity of the completed films.

For these reasons, and because of variations in electrode spacing and area and differences in bell jar volume which depend upon the particular apparatus used, optimum operating parameters must be determined by experiment for each particular setup and for each material being polymerized. It is to be noted that the ranges of pressure and current over which the process may be operated do not seem to be particularly critical, so long as the limits specified are determined and not exceeded.

Analysis of films produced by the process described above indicate that, in the case of styrene monomer starting material, for example, substantially complete polymerization has taken place in the material deposited, resulting in the formation of a substantially insoluble, cross-linked film of essentially polystyrene material. Resistivities on the order of $10^{17}$ ohm-centimeters have ben obtained.

Materials other than styrene monomer may be used as a starting material in the process. For example, benzene vapor has been used and, although the benzene ring structure was apparently destroyed by the ionization process, cross-linked organic insulating films of a continuous, homogeneous character and of resistivities of about $10^{15}$ ohm-centimeters (before polarization current flow subsided) were produced. Styrene, benzene, toluene, ethylene, vinyl chloride, methyl methacrylate, divinyl benzene and mixtures of these have been used as starting materials, all producing cross-linked dielectric films of a continuous, homogeneous character.

It is to be understood that polymerization of organic films may be carried out with different apparatus and different types of electric fields from those described above. For example, the films may be produced on non-conductive objects rather than on electrodes 46 and 48 above by placing the object in the region of field in front of one or the other electrode so that charged organic particles attracted to a charged electrode will be intercepted by the object and will polymerize thereon. Similarly, the sixty-cycle alternating current supply may be supplanted by a radio frequency current supply or by a direct current supply for energizing electrodes to provide the discharge. Alternatively, and illustrating both of these principles, a film of organic material may be polymerized on the inner surface of a bell jar such as that of Fig. 1 by applying the discharge of a Tesla coil by means of an electrode held against the outer surface of the glass, electrodes 46 and 48 being unused.

Electrodes coated with dielectric film have utility, for example, in batteries activated by beta-emitting radiation sources such as are disclosed in U.S. patent application Ser. No. 284,395, filed by John H. Coleman on April 25, 1952, now abandoned, and assigned to the same assignee. As disclosed in that application, the presence of a dielectric film is required over the beta collector electrode surfaces in batteries containing ionized gas so as to prevent charge leakage from the electrode through the conductive gas. Inasmuch as the efficiency of the battery depends upon the beta current reaching the collector electrode, when tritium is utilized as the radiation source a 50% current efficiency may be obtained by using a film produced from styrene monomer in the manner described above and having a one micron thickness. Such a film, being essentially pin-hole free, is ideally suited for this application, having been found to have breakdown voltages of greater than 200 volts.

A second use for dielectric films produced according to the teachings of the invention is in the capacitor illustrated in Figs. 2 and 3.

In Fig. 2, capacitor 134 appears as a laminate on one surface of flexible supporting tape 132, such as "mylar" (polyethylene terephthalate). One end of the capacitor tape assembly is fastened to the surface of core or mandrel 130 which, for ease in making electrical connection to capacitor 134, is made of metal although other materials may be used. As will be seen in the detailed view of Fig. 3, the innermost layer of the laminar capacitor 134 is metal electrode 142 which extends beyond the capacitor body proper, so that when rolling capacitor 134 on mandrel 130 with the extended portion of electrode 142 placed against mandrel 130, electrical connection is made therewith. Similarly, connection is made to outer electrode 144 of capacitor 134 by means of tab 136 fastened to the opposite end of supporting tape 132. While the capacitor assembly is shown here in partially unrolled condition, it will be understood that completion of the assembly merely involves rolling the remainder of tape 132 and its associated capacitor 134 around core 130, and securing the tab and capacitor assembly against unrolling in any well known manner. Where required, as to protect the capacitor against adverse atmospheric environments, the assembly may be "potted" or otherwise hermetically sealed.

Fig. 3 shows an enlarged cross-section of the tape and capacitor structure of Fig. 2. Capacitor 134 is formed by successive deposition of layers of material on one surface of supporting tape 132 as follows. Electrode 138 is first applied to the surface of film 132 by vapor deposition. It has been found that a film of aluminum approximately .5 micron thick, vapor deposited, as conventionally in a bell jar, makes a satisfactory electrode. A small portion 141 of the tab end of tape 132 should be masked during this operation to provide unmetallized tape surface for purposes which will be made clear below. Dielectric film 140 is then deposited over metallized electrode 138 by polymerization in the manner as described above. It should be noted that in performing the polymerization, metallized electrode 138 serves as one electrode in the discharge circuit, the newly deposited electrode 138 being substituted for electrode 46 in the apparatus of Fig. 1, for example, with electrode 138 exposed to the discharge space. If desired, several tapes can be mounted on bracket 42, being electrically connected together and then connected to the power supply by means of lead 50. In the same manner, more such tapes may be substituted for electrode 48 and connected to lead 52. The processing procedure described above may then be followed, admitting vaporous styrene monomer and forming polymerized dielectric films 140 on electrodes 138 by means of an electric discharge between the electrodes. It should be noted that a portion 142 at the tab end of each electrode 138 is kept free of dielectric film 138 during the dielectric coating process so as to provide an exposed surface portion of electrode 138 for contacting mandrel 130. This may be accomplished by screening portion 142 from the discharge by means of a metal or insulating shield placed across the end of the tape during the dielectric coating process.

The final step in preparing capacitor 134 comprises evaporation of electrode 144 onto dielectric film 140. This may be accomplished in the same way as with electrode 138, care being taken to mask the mandrel end of dielectric film 140 from depositing metal so as to avoid making electrical connection between base electrode 138 and new electrode 144. The completed capacitor tape assembly may then be tabbed and rolled onto core 130 as described above.

Cylindrical capacitors of the sort described above have been made having .05 mfd. capacity and a diameter (neglecting the tab) of less than .070 inch. In these capacitors, supporting base 132 comprised .00025 inch "mylar" film 1 inch wide and 5 inches long. Electrodes 138 and 144 were metallized aluminum, approximately .5 micron thick, and dielectric film 140 was made of styrene monomer polymerized in situ to a thickness of about 1 micron. Tab 136 was made of .00025 inch aluminum foil, and to simplify the structure was made 1" wide, matching the width of the tape, and extended approximately .25" from the end of the tape, so as to provide, when rolled onto the outside of the cylindrical capacitor, a tough shell combined with a connecting surface for one capacitor electrode. Mechanical and electrical connections between mandrel 130, which was a wire .040 inch in diameter, and electrode 138 and between tab 136 and electrode 134 are made by means of a silver-containing lacquer.

It should be noted that other materials than "mylar" may be used for supporting tape 132. "Mylar" has been described in the preferred embodiment because of its toughness and flexibility in films as thin as .00025 inch. The use of even thinner tapes would improve the volumetric efficiency of the rolled capacitor structure. On the other hand, metal foil may be substituted for supporting base 132 and then would also serve as electrode 138, eliminating one vapor deposition step in processing. Extension of insulating film 140 to the tab end of the strip would then be required, however, to prevent short circuit between electrodes.

While the invention has been described in particularity with respect to capacitor and radioactive battery electrodes, it will be apparent to those skilled in the art that modifications may be made in the process and that dielectric films may be applied to conductive and non-conductive objects of other than planar configuration while remaining within the spirit of the invention.

I claim:

1. A method of forming a dielectric film upon an electrode surface, which includes the steps of exposing said surface to a gaseous polymerizable dielectric-film-forming substance which is substantially free from entrained solids and liquids, simultaneously maintaining an electric field in the region of said surface to cause a glow discharge to said surface and controlling the rate and duration of said discharge, to form on said surface a solid, continuous, polymerized homogeneous dielectric film of high resistivity, and limiting the current flow in said discharge to prevent reduction in said resistivity of said film during formation thereof.

2. The article produced by the method of claim 1.

3. A method according to claim 1 including the step of evacuating the space adjacent to said electrode surface.

4. A method of forming a dielectric film upon an electrode surface, which includes the steps of exposing said surface to a gaseous polymerizable dielectric-film-forming substance which is substantially free from entrained solids and liquids, simultaneously maintaining an electric field in the region of said surface to cause a glow discharge to said surface and controlling the rate and duration of said discharge, to form on said surface a solid, continuous, polymerized homogeneous dielectric film having a resistivity of at least about $10^{14}$ ohm-centimeters, and limiting the current flow in said discharge to prevent reduction in said resistivity of said film during formation thereof.

5. A method of forming a dielectric film upon an electrode surface, which includes the steps of exposing said surface to a gaseous polymerizable dielectric-film-forming substance which is substantially free from entrained solids and liquids, simultaneously maintaining an electric field in the region of said surface to cause a glow discharge to said surface and controlling the rate and duration of said discharge, to form on said surface a solid, continuous, polymerized homogeneous dielectric film of high resistivity, and limiting the current flow in said discharge to prevent reduction in said resistivity of said film during formation thereof, and thereafter applying an electrode to the exposed surface of said film.

6. A capacitance element produced by the method of claim 5.

References Cited in the file of this patent

UNITED STATES PATENTS

| | | |
|---|---|---|
| 1,784,611 | Polanyi et al. | Dec. 9, 1930 |
| 2,258,218 | Rochow | Oct. 7, 1941 |
| 2,479,540 | Osterberg | Aug. 16, 1949 |
| 2,551,035 | Miller | May 1, 1951 |
| 2,665,400 | Walker | Jan. 5, 1954 |
| 2,668,936 | Robinson | Feb. 9, 1954 |
| 2,722,492 | Ralston | Nov. 1, 1955 |
| 2,730,467 | Daszewski | Jan. 10, 1956 |
| 2,754,230 | McLean et al. | July 10, 1956 |
| 2,762,722 | Truby | Sept. 11, 1956 |
| 2,806,985 | Lamphier | Sept. 17, 1957 |